United States Patent [19]

Chang

[11] Patent Number: 5,644,194
[45] Date of Patent: Jul. 1, 1997

[54] CIRCUIT FOR CONTROLLING AN INDICATOR LIGHT TO TURN OFF SLOWLY

[75] Inventor: Kok Chin Chang, Singapore, Singapore

[73] Assignee: TriTech Microelectronics International, Pte, Ltd., Singapore, Singapore

[21] Appl. No.: 503,174

[22] Filed: Jul. 17, 1995

[51] Int. Cl.$^6$ ................................................. H05B 37/02
[52] U.S. Cl. .................. 315/123; 315/169.3; 315/360; 315/136; 315/227 R
[58] Field of Search .................................. 315/169.3, 360, 315/129, 136, 119, 123, 227 R

[56] References Cited

U.S. PATENT DOCUMENTS

| | | | |
|---|---|---|---|
| 4,486,691 | 12/1984 | Beggs | 315/241 S |
| 4,646,079 | 2/1987 | Kitai et al. | 315/169.3 |
| 4,924,109 | 5/1990 | Weber | 307/126 |

Primary Examiner—Robert Pascal
Assistant Examiner—Michael Shingleton
Attorney, Agent, or Firm—George O. Saile; William S. Robertson

[57] ABSTRACT

A circuit for turning off an indicator light operates in two phases that provide a first rapid discharge phase and a second slow discharge phase. This sequence dims the light in a visual approximation of the exponential dimming that occurs with lights that operate with power supplies that have capacitors that give a slow turn off. The preferred light is an electroluminescent element that will be called a glow-effect capacitor which stores sufficient charge for slow turn off. When a switch associated with the light is opened, an FET turns on to discharge the capacitor rapidly to a selected voltage. This FET is then turned off and other components discharge the capacitor slowly. The switching signal for this FET is formed as a logic function of the switch position (open or closed) and the occurrence of the selected voltage level on the glow-effect capacitor.

7 Claims, 2 Drawing Sheets

CIRCUIT FOR CONTROLLING AN INDICATOR LIGHT TO TURN OFF SLOWLY

INTRODUCTION

Panel indicator lights are familiar in many electronic devices. As a relevant example, when a switch is closed (conducting) an associated light is turned on and when the switch is opened the light is turned off. Often it is desirable for the panel light to turn off slowly after the switch has been opened. In the past, these lights dimmed slowly because capacitors associated with the light or its power supply discharged slowly. This is not feasible in small integrated circuits.

This slow turn off is to be contrasted with a simple delay that would for example keep a car's headlights on at full brightness until a driver had locked the car and entered a nearby house.

There are similar uses for a slow turn off, for example for a light that could be switched off but remain dimly lighted long enough for a person leave the room while the light is still glowing. The dimming would signal to the person that the switching operating was taking place.

SUMMARY OF THE INVENTION

One object of this invention is to provide a new and improved circuit for turning off an indicator light slowly after an associated switch or other device has been opened.

The invention is particularly useful with an electroluminescent element that will be called a glow-effect capacitor that is used as an indicator light. A glow-effect capacitor is a charge storage device and it emits light so long as it holds a suitable charge. Commonly the charge can be held for longer than the expected delay in an indicator light, and a glow-effect capacitor is ordinarily turned off with a switch that discharges the capacitor rapidly.

The circuit of this invention has an FET that supplies a fixed voltage to charge the glow-effect capacitor in response to the closing of the associated switch. When the switch is opened, this FET turns off and other components turn on to discharge the capacitor in two phases. In the first phase another FET turns on momentarily to discharge the capacitor rapidly to a selected voltage. In the second phase, the rapid discharge FET is turned off and other components discharge the capacitor slowly. A voltage level sensitive circuit controls switching from the first phase to the second phase.

The two phases give the appearance of a normal exponential discharge of a capacitor that continues to supply current to a light after it has been turned off.

Apparatus that uses this invention will have one circuit for each indicator light, and one object of the invention is to acheive low power in the circuit.

The detailed description of the preferred embodiment of the invention will explain other features and advantages of the invention.

THE DRAWING

THE PREFERRED EMBODIMENT

Introduction

Figure 1:
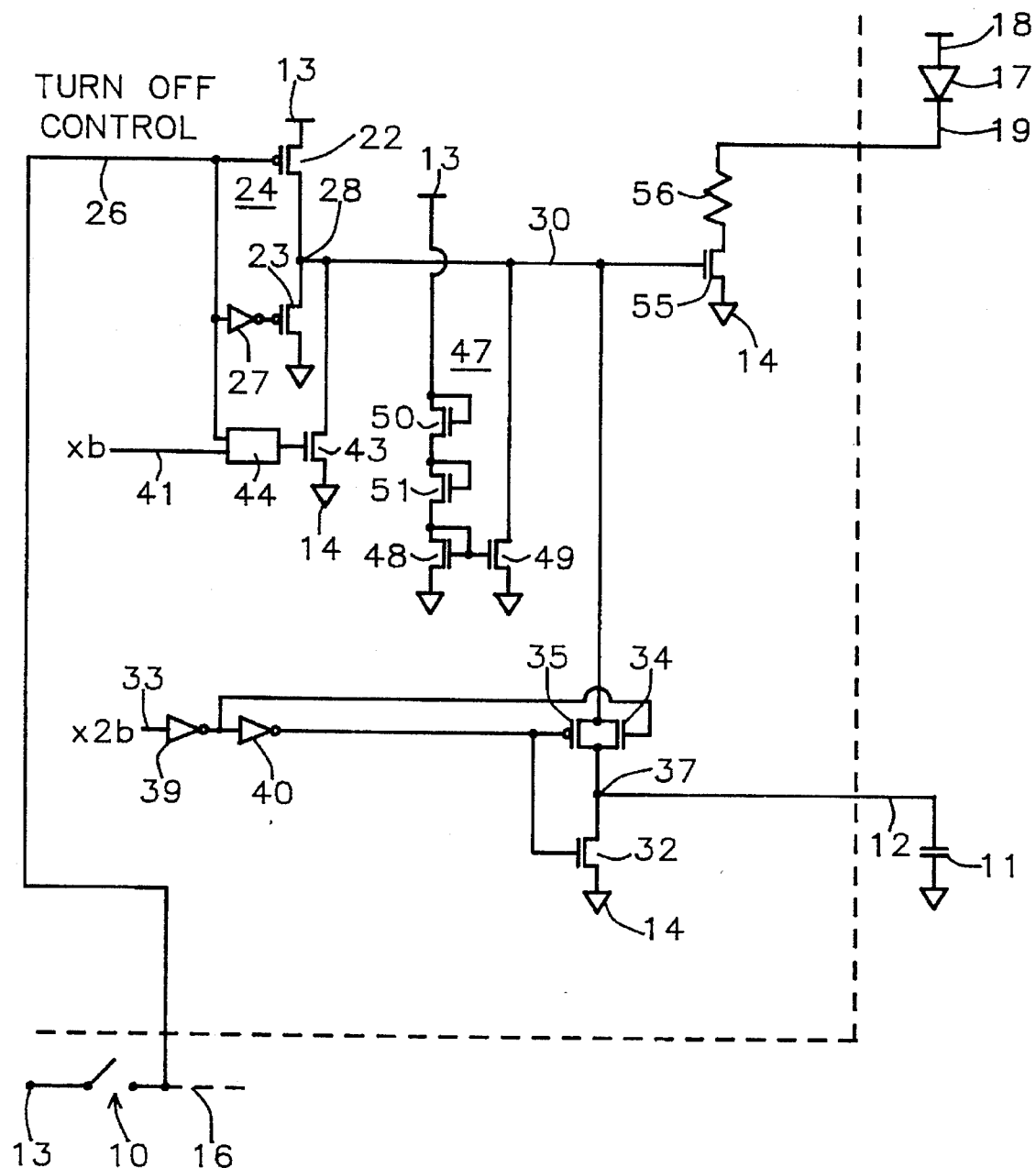
FIG. 1 is a schematic drawing of the circuit of this invention.

A dashed line in FIG. 1 separates the circuit of this invention from associated components. Ordinarily the circuit of this invention will be formed on one chip and the glow-effect capacitor and some other components will be formed separately; alternatively the glow-effect capacitor can be integrated with the circuit.

A switch 10 and a glow-effect capacitor 11 are shown outside the dashed line. A conductive line 12 connects the glow-effect capacitor to components of this invention. A glow-effect capacitor is a charge storage device, and as will be explained, the circuit of this invention discharges the capacitor at a controlled rate to achieve the delayed turn off associated with power supply capacitors. Ordinarily, apparatus with several glow-effect capacitor indicator lights will have several of the circuits of the invention, and each circuit will control a single glow effect capacitor, as the drawing shows.

The drawing shows connections for power supply terminals 13 VDD and 14 (VSS, ground), and one pole of switch 10 is connected to terminal 13. A line 16 connects the opposite terminal of the switch to a component (not shown) that is controlled by the switch. (Alternatively, switch 10 can have separate terminals for switching the associated component to a different voltage supply.) Line 16 is also connected to form a signal for turning on the glow-effect capacitor 11 on rapidly and off slowly with switch 10.

A light emitting diode 17 of an optical coupler (DPTO) is also shown outside the dashed line. A conductive line 18 connects the anode of the diode to a positive voltage point and conductive line 19 connects the diode to components of the invention that will be described later. An optical coupler includes a light detecting diode (not shown) that produces an output that is electrically isolated from line 18. These components are conventional and will be understood from the description later of the operation of the circuit of the drawing.

Figure 2:
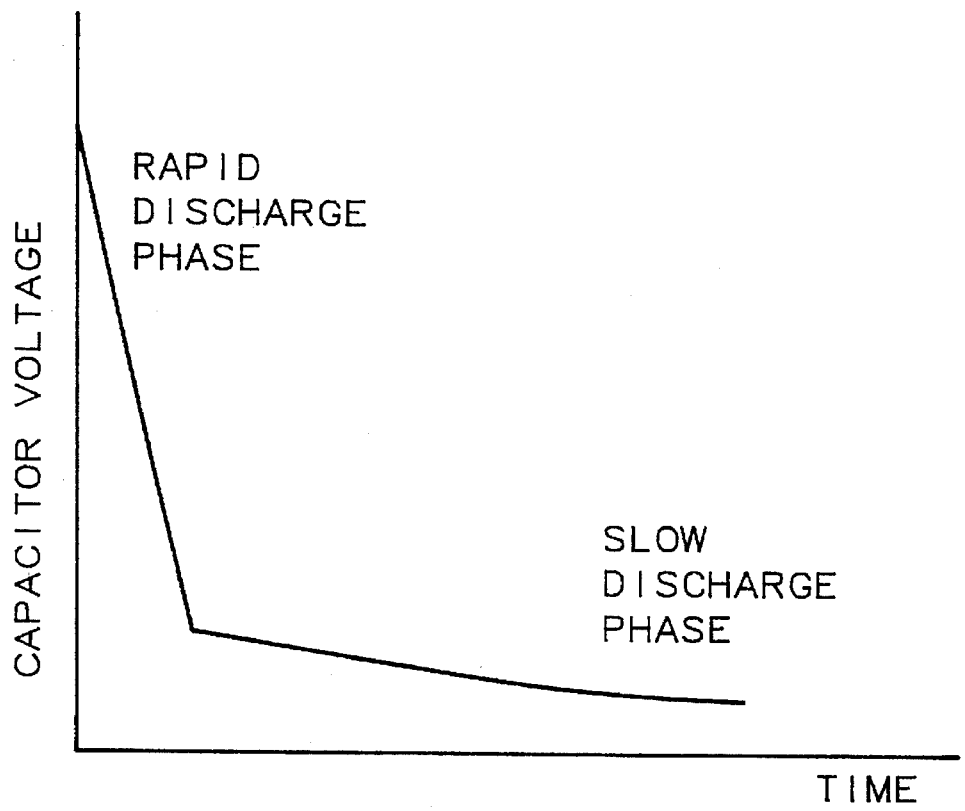
FIG. 2 is a plot that shows the fall of the light voltage in two phases during the turn-off sequence.

Introduction to the Operation—FIG. 2

In the plot of FIG. 2, the vertical axis is the voltage of the glow-effect capacitor and the horizontal axis is time. The glow-effect capacitor dims in two phases. The voltage has a rapid fall in a short first phase and a slow fall in a second phase. Different components operate during the two phases. The times for the two phases and the voltage drop during each phase will be chosen to produce a pleasing effect, and the circuit techniques for controlling the times and voltages will be understood from the specific description of the circuit and its operation.

Inverter Circuit 24

Two FETs 22, 23 are connected between VDD and ground to form an inverter circuit 24. Preferably these FETs are of like channel conductivity type, preferably p-channel.

The gate of the upper FET 22 is connected directly to line 23 to receive the signal Turn Off, and the gate of the lower FET 23 is connected to line 23 through an inverter 27 to receive the complement of this signal. The two FETs 22, 23 switch oppositely in response to the complementary signals at their gate terminals, and when signal Turn Off is active (and has a down level) upper FET 22 pulls up output node 28 and line 30. When signal Turn Off is inactive (and has an up level) lower FET 23 pulls down a line 30. When line 30 is up, glow effect capacitor 11 receives a voltage and an accompanying charge through a circuit path that will described later. When line 30 is down, glow-effect capacitor 11 is discharged as will be described later.

Inverter Circuit of FET 32

An FET 32 is connected with other components to form an inverter that controls the glow effect capacitor 11 in response to signal x2b on line 33. FET 32 is connected with two parallel connected FETs 34, 35 to connect and disconnect the glow-effect capacitor 11 to line 30 (and from there, through upper FET 22 to the positive power supply point 13).

When FET 32 is turned on, it pulls down node 37 and line 12 and turns off the glow-effect capacitor. When FET 32 is turned off, it isolates node 37 from ground, and FETs 34 and 35 conduct control the connection of glow-effect capacitor 11 to line 30.

A first buffer circuit 39 (an inverter) connects the gate of n-channel FET 34 to receive the complement of signal x2b and a second inverter 40 in series with inverter 39 provides the true phase of signal x2b at the gate of FET 35. (The delay produced by these inverters is not the basis for the delayed turn off of the lights, and the circuit will operate with only FET 34.) FETs 34 and 35 are of opposite channel conductivity type and they turn on an off together in response to the opposite phases of signal x2b.

The Inverter Circuit of FET 43

An FET 43 is also connected to conduct between line 30 and ground. When it is turned off, it permits the circuit to be controlled from signal xb on line 41. When it is turned on it pulls down line 30 without regard to the other components that are connected to line 30.

FET 43 conducts in parallel with the lower FET of inverter 24 and pulls down line 30 in response to a logic function of the signal Turn Off on line 23 and the signal xb on line 24. A logic gate 44 combines these signals and provides the logical product at the gate of FET 43.

The mirror circuit

A weak mirror circuit 47 is also connected to conduct between line 30 (which is connected to capacitor 11) and ground. As is conventional, the current mirror has two FETs 48, 49 with their source terminals connected to ground and their gate terminals connected to have the same potential. These FETs are manufactured on the same chip and in this configuration tend to conduct the same current at their drain terminals. Several FETs 50, 51 are connected to form a resistor in the drain circuit of FET 49 and they cooperate with power supply point 13 to form a current source. (The volt-ampere plot shows that the current varies over a small range as the voltage varies over a large range.) Thus, a selected current appears at the drain of FET 43, and this drain is connected to line 30.

As will be explained later, this current source causes the the glow-effect capacitor to discharge at a selected rate during the second phase of the turn off operation. If the current source is stiff (a wide voltage range across the resistor FETs to establish a small current range), the discharge is approximately linear. Preferably the circuit forms a weak current mirror (a weak current source), which allows a selected droop in the curve of FIG. 2, which perceptibly follows the dimming associated with the discharge of large capacitors.

The Circuit of FET 55

Line 30 also provides a signal to diode 17 of the optical coupler, and FET 55 is turned on when line 30 is up (and Turn Off Control is down). The line 18 from the diode is connected to a positive power supply point and an FET 55 and a resistor 56 of 500 ohms connect the cathode to ground and thereby complete the circuit. When FET 55 is turned on, a forward current flows across the diode junction and causes it to emit light.

Operation—Steady State

When switch 10 is closed, signal x2b on line 18 has a value to enable logic gate 44 to turn on FET 43, but signal Turn Off Control on line 26 has a value to inhibit gate 44, and FET 43 is kept turned off. FET 22 connects line 30 to receive the power supply voltage. FET 55 signals this voltage at the output of the optical coupler (as will be explained later). The circuit of FET 32 connects capacitor line 12 to line 30 and isolates this line from ground, the the glow-effect capacitor emits light. Current mirror 47 draws a small current from line 30 but does not interfere with the operation of the light.

An Alternative Operation

Note that when FET 32 is on and parallel FETs 34, 35 are off, the glow-effect capacitor 11 is isolated from line 30 and its connecting line 12 is connected to ground through FET 32. The glow-effect capacitor dims substantially instantaneously when the switch is opened. In the operations in which the glow-effect capacitor dims slowly, line 33 remains high, FET 32 remains off and isolates the glow-effect capacitor from ground, and FETs 34, 35 remain on and connect line 12 to line 30. Signal x2b on line 33 can be established at a permanent up or down level to operate in a selected mode. Alternatively it can be controlled selectively by a manually operated switch or by other suitable means.

The Rapid Dimming Phase—FET 43

As will be explained later, signal xb on line 41 has a binary value to turn on FET 43 except during the slow discharge phase. When switch 10 is opened and signal Turn Off Control falls on line 26 (and upper FET 22 turns on and lower PET 23 turns off), the logical coincidence of the signal xb and the Turn On Control on line 26 turn on FET 43, and FET 43 discharges capacitor 11 rapidly to a selected value. FET 43 is turned off at a suitable point to end the rapid discharge phase and begin the slow discharge phase.

The Slow Phase

When FET 43 is turned off to end the rapid discharge phase, the current mirror 47 continues to conduct a selected small current to gradually discharge line 30 continuously. Note that the current mirror also conducts in parallel with FET 43 during the first rapid phase. The conduction of FET 43 and the current mirror 49 are made sufficiently different to produce the desired dimming rate.

Note that lower FET 23 conducts in parallel with FET 43 during the rapid phase and it conducts in parallel with current mirror 47 during the slow phase. FET 23 is given a suitably low conductance so that it does not raise the discharge rate above the desired rate (for example its channel can be made long and narrow); FET 23 has sufficient conductance to hold line 30 down after the light dimming operation. Note that upper FET 22 is not turned on at the same time either lower FET 23 or FET 43 is turned on.

Signal xb

As glow-effect capacitor 11 turns off, the voltage on line 30 falls similarly. FET 55 receives this falling voltage at its gate terminal and produces a function of this voltage on line 19 to diode 17 of the optical coupler. The output of the optical coupler is applied to a level sensing circuit (conventional and not shown) that produces signal xb with a level to turn on FET 43 when the voltage on line 30 is high and to turn off FET when the voltage has fallen to an amount that corresponds to the end of the rapid discharge phase. Thus, signal xb normally has a level to turn on FET 43, but the signal at the output of logic gate is held down by the up level of Turn Off Control on line 26. When Turn Off Control falls, the gate output rises and turns on FET 43.

Other Embodiments

From this description of the preferred embodiment of the invention, those skilled in the art will recognize other applications for the invention and variations in the circuit within the skill of the art and the intended scope of the claims.

I claim:

1. A circuit for discharging a charge storage device, such as a glow-effect capacitor (11) in discrete steps, the circuit comprising, means (10), such as a switch, providing a binary signal (26) that the charge storage device is to be turned on or to be turned off, a first FET (22) and a line (30) connecting the first FET between the charge storage device and a power supply point (13) for supplying charge to operate the charge storage device, rapid discharge means comprising a second FET (43) connected between the line (30) and circuit ground (14) for discharging the charge storage device, means (17, 55) for producing a first signal (41) for turning off the rapid discharge means at a predetermined point, means (33, 44) responsive to one value of the binary signal to turn off the first FET (22) and to turn on the second FET (43) to discharge the charge storage device at a selected rapid rate, the means comprising a logic gate (44) responsive to the binary signal and to the signal (41) for turning off the rapid discharge means at the predetermined point, the means for producing the signal (41) for turning off the rapid discharge means including an FET (55) for producing a signal (19) representing the voltage on the charge storage device, and means for producing the first signal in a binary state that turns on the rapid discharge means in coincidence with the value of the binary signal, and means responsive to a predetermined voltage level of the charge storage device for switching the first signal to its other binary state for turning off the rapid discharge means, the means (17, 55) for producing the signal (41) for turning off the rapid discharge means at a predetermined point producing the signal at a predetermined point in the fall of the charge voltage on the line, and means (47) for thereafter discharging the charge storage device at a lower rate comprising a current mirror (47) connected between the line (30) and circuit ground (14), the current mirror being a weak current mirror for discharging the charge storage device with a preceptable exponential characteristic.

2. The circuit of claim 1 including means (32) responsive to the binary signal for discharging the charge storage device rapidly.

3. The circuit of claim 2 wherein the means for discharging the charge storage device rapidly includes means (34, 35) for isolating the charge storage device from the line (30).

4. The circuit of claim 3 wherein the third FET is in parallel circuit path with the FET of the rapid discharge means and the means for discharging the charge storage device at a lower rate of the slow discharge means, and wherein the third FET has a sufficiently low conductance to not significantly affect the discharge rate.

5. The circuit of claim 1 including a third FET (23) connected to form an inverter with the first FET (22) for switching the line (30) between high and low voltage levels and wherein the first FET and the third FET switch oppositely in response to the binary signal.

6. The circuit of claim 1 wherein the charge storage device is an indicator light.

7. The circuit of claim 6 wherein the charge storage device is a glow-effect capacitor (11).

* * * * *